United States Patent [19]

Ninomiya et al.

[11] Patent Number: 5,093,098
[45] Date of Patent: Mar. 3, 1992

[54] METHOD OF CONTROLLING WATER/HYDROGEN ISOTOPIC EXCHANGE REACTION PLANT

[75] Inventors: Ryuji Ninomiya; Shigeru Yoshizumi, both of Kawasaki; Shiko Kiyota; Takuya Kitabata, both of Tsuruga, all of Japan

[73] Assignee: Doryokuro Kakunenryo Kaihatsu Jigyodan, Tokyo, Japan

[21] Appl. No.: 531,682

[22] Filed: Jun. 1, 1990

[30] Foreign Application Priority Data

Jun. 7, 1989 [JP] Japan ................. 1-144492

[51] Int. Cl.$^5$ ............................ C01B 4/00; C01B 5/02
[52] U.S. Cl. ........................... 423/580; 204/129; 423/647.7
[58] Field of Search ............. 423/580, 647.7; 204/129

[56] References Cited

U.S. PATENT DOCUMENTS

4,173,620 11/1979 Shimizu .................... 423/580
4,191,626 3/1980 Hammerli et al. .......... 423/580

*Primary Examiner*—Wayne A. Langel
*Attorney, Agent, or Firm*—Wenderoth, Lind & Ponack

[57] ABSTRACT

A method of controlling a single temperature type water/hydrogen isotopic exchange reaction plant comprising an electrolytic system, an exchange reaction column and a recombining system for separating degraded heavy water into product and waste both of which have a stable concentration. The control method comprises controlling an extracting quantity of waste so that a heavy water concentration of water at an intermediate portion of the reaction column is kept constant, and controlling an extracting quantity of product so that a water quantity inside the exchange reaction plant is kept constant.

3 Claims, 6 Drawing Sheets

METHOD OF CONTROLLING WATER/HYDROGEN ISOTOPIC EXCHANGE REACTION PLANT

BACKGROUND OF THE INVENTION

This invention relates to a method of controlling a water/hydrogen isotopic exchange reaction plant of a single temperature type comprising a combination of an electrolytic system, an exchange reaction column and a recombining system. More particularly, it relates to a control method of such a water/hydrogen isotopic exchange reaction plant for effectively separating heavy water having a concentration lowered by light water (hereinafter referred to as "degraded heavy water") into high concentration heavy water (hereinafter referred to as "product") and high concentration light water (hereinafter referred to as "waste").

When degraded heavy water is separated into product and waste by using a single temperature type water/hydrogen isotopic exchange reaction plant (hereinafter referred to as the "exchange reaction plant"), the resulting product is used as a moderator of a nuclear reactor. Thus, it must hardly contain light water (ordinary, heavy water concentration of at least 99.7 wt %). On the other hand, the resulting waste must hardly contain heavy water (light water concentration of at least 99.9 wt %) to prevent the loss of precious heavy water.

Therefore, the extracting quantities of product and waste from the exchange reaction plant must be in match with the material balance for degraded heavy water, and product and waste suitable for the condition described above cannot be obtained unless control of the extracting quantities is conducted extremely accurately.

Generally, the control described above is conducted by measuring the concentration of heavy water in product, controlling the extracting quantity of product so that the concentration thereof is kept constant and controlling the extracting quantity of waste so that the water quantity inside the exchange reaction plant, which changes with the supply of degraded heavy water and with the extraction of product, is kept constant.

Figure 6:
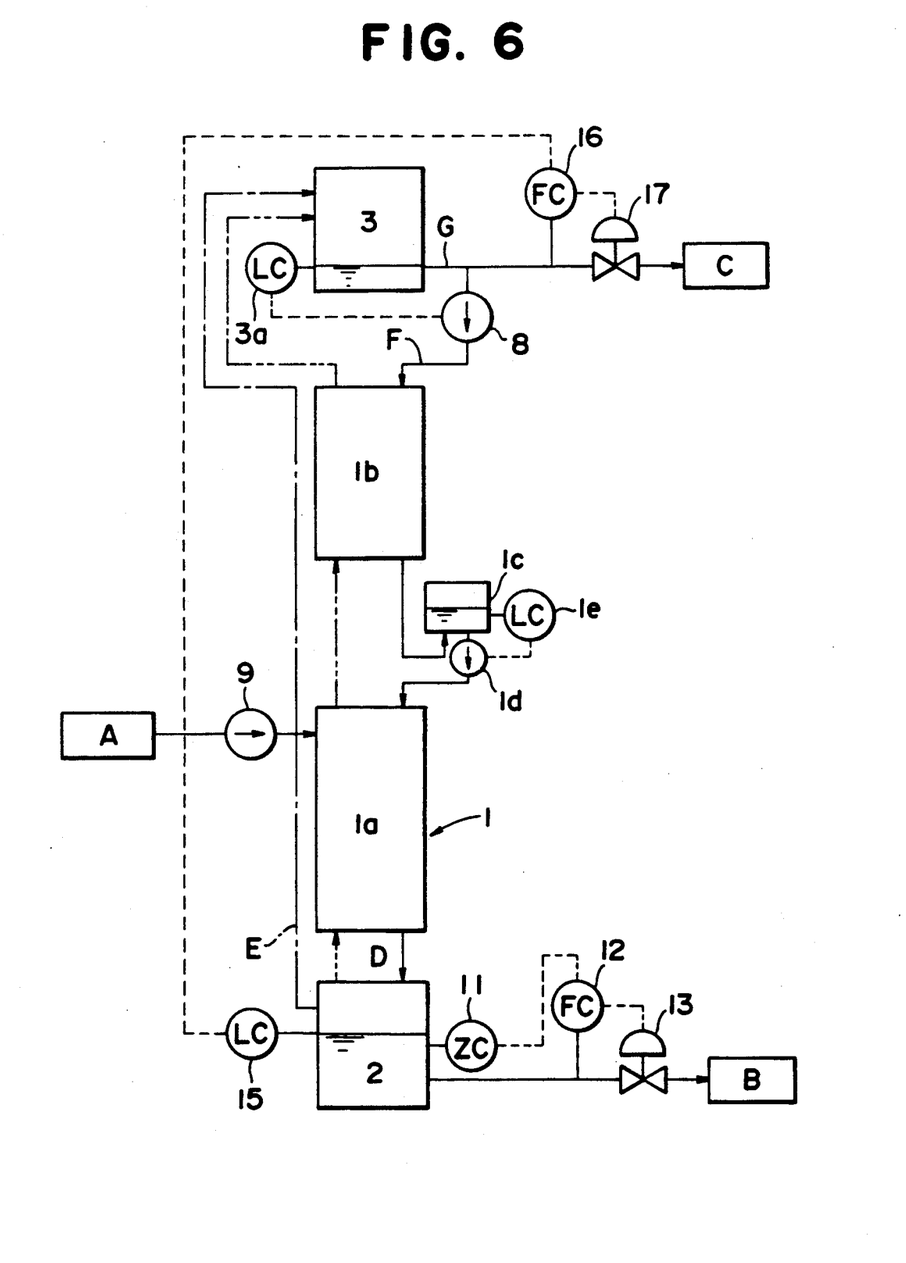
FIG. 6 is an explanatory view showing a control method in a conventional exchange reaction plant.

An example of a conventional single temperature type water/hydrogen isotopic exchange reaction plant is shown in FIG. 6 in which reference numeral 1 represents a water/ hydrogen isotopic exchange reaction column (hereinafter referred to as the "reaction column"). The reaction column 1 is divided into two portions 1a and 1b so as to reduce its height. These two portions 1a and 1b, however, function as a unitary reaction column by means of a tank 1c, a pump 1d and a level controller (LC) 1e for the tank. Reference numeral 2 represents an electrolytic system including therein an electrolytic cell having a diaphragm, and reference numeral 3 represents a recombining system of hydrogen and oxygen. A level controller (LC) 15 is mounted to the electrolytic system 2.

Hydrogen D and oxygen E generated from the electrolytic system 2 are sent to the bottom of the reaction column 1 and to the recombining system 3, respectively.

Hydrogen introduced into the bottom of the reaction column 1 is exchanged for light hydrogen contained in descending water during its ascent inside the column. Hydrogen leaving the column top of the reaction column 1 is introduced into the recombining system 3, where it is recombined with oxygen introduced into the recombining system 3. Recombined water G is subjected to level control by a level controller (LC) 3a and is introduced into the top of the reaction column 1 as reflux water F by a pump 8.

Degraded heavy water can be separated by the exchange reaction plant described above into product and waste in the following manner. First, degraded heavy water A is introduced into the intermediate portion of the reaction column 1 by a raw material pump 9. Degraded heavy water A then comes into countercurrent contact with heavy hydrogen that is generated from the electrolytic system 2, and is introduced into the bottom of the reaction column 1 to exchange light hydrogen in degraded heavy water A for heavy hydrogen, and flows out from the column bottom as heavy water which is then introduced into the electrolytic system 2.

Hydrogen that comes into contact with degraded heavy water and entraps therein light hydrogen rises further inside the column, comes into countercurrent contact with reflux water F introduced from the column top, exchanges remaining heavy hydrogen for light hydrogen in reflux water F and is introduced as light hydrogen into the recombining system 3. In this instance, reflux water F entraps heavy hydrogen during its descent and attains substantially the same heavy water concentration as that of degraded heavy water A at the portion where this degraded heavy water A is introduced.

The exchange reaction plant operated in the above-mentioned manner is controlled by operating a heavy water concentration controller (ZC) 11 so that the concentration of heavy water in the electrolytic system 2 is kept constant, and operating a control valve 13 through a flow rate controller (FC) 12 to withdraw product B.

On the other hand, waste C is withdrawn by providing a piping extending from the recombining system 3 to the top of the reaction column 1, sending an output of the level controller (LC) 15 of the electrolytic system 2 (which represents the water quantity inside the exchange reaction plant) as a flow rate set signal to a flow rate controller (FC) 16 and operating a control valve 17 by this FC 16.

As a result of the control described above, the concentration of product heavy water and the water quantity inside the exchange reaction plant are kept constant, and the heavy water concentration in product B as well as the light water concentration in waste C have high concentrations as desired.

However, when the water quantity remaining at each portion of the exchange reaction plant is examined, the water retention quantity is small in the reaction column 1, while the water retention quantity in the tank (1c in FIG. 6) (which is provided in the case where the reaction column is divided in order to reduce its height) is extremely great. The residence time of reflux water F ranges from several minutes to several hours. Furthermore, the retention quantity of recombined water G is great in the recombining system 3 but its residence time is also within several hours with respect to the recombined water quantity.

In contrast, since the electrolytic system 2 has an extremely large capacity, the residence time with respect to the extracting quantity of product is about 100 hours.

In accordance with the control method such as shown in FIG. 6, therefore, response to the change of the product concentration is extremely slow and the extracting quantity of waste changes drastically though the heavy water concentration hardly changes. Thus the light water concentration in waste deviates from a predetermined value and the control cannot be made any more.

To cope with this problem, the heavy water concentration in waste can be controlled with high response by extracting waste so that the light water concentration or the heavy water concentraction in waste is kept constant.

Though an extremely expensive infrared absorptiometry is known as a method of measuring continuously a trace amount of heavy water concentration in waste, the application of this method to the control system involves the problems in stability and reliability.

SUMMARY OF THE INVENTION

An object of the present invention is to provide a method of controlling a single temperature type water/ hydrogen isotopic exchange reaction plant which can effectively and stably separate degraded heavy water into product and waste.

According to the present invention, in order to accomplish the above-described object, there is provided a method of controlling a single temperature type water/ hydrogen isotopic exchange reaction plant comprising an electrolytic system, an exchange reaction column and a recombining system for separating degraded heavy water into product and waste.

In one aspect of the present invention, the control method comprises controlling an extracting quantity of waste so that a heavy water concentration of water at an intermediate portion of the reaction column is kept constant, and controlling an extracting quantity of product so that a water quantity inside the exchange reaction plant is kept constant.

In another aspect of the present invention, the control method comprises dividing recombined water discharged from the recombining system into a flow of waste and a flow of reflux water, controlling the flow rate of reflux water to the reaction column so that a heavy water concentration of water at an intermediated portion of the reaction column is kept constant, extracting waste so that a water quantity in the recombining system is kept constant, and controlling an extracting quantity of product so that a water quantity inside the exchange reaction plant is kept constant.

In either of these control methods according to the present invention, a mixture of light and heavy water having a high heavy water concentration exists at the intermediate portion of the reaction column and its heavy water concentration can be measured by measuring the density or the like.

The portion where the concentrations of heavy and light water inside the reaction column can be measured easily by measuring the density or the like, is the portion where the heavy water concentration is from several % to about 95%. Therefore, the heavy water concentration can be measured sufficiently by the density or the like, by dividing the reaction column at the portion where the heavy water concentration is the value falling within this range. Of course, it is not essential to divide the reaction column into a plurality of portions. However, if the reaction column is divided, it is convenient because water in the tank can be used for measurement of the heavy water concentration.

PREFERRED EMBODIMENTS OF THE INVENTION

Figure 1:
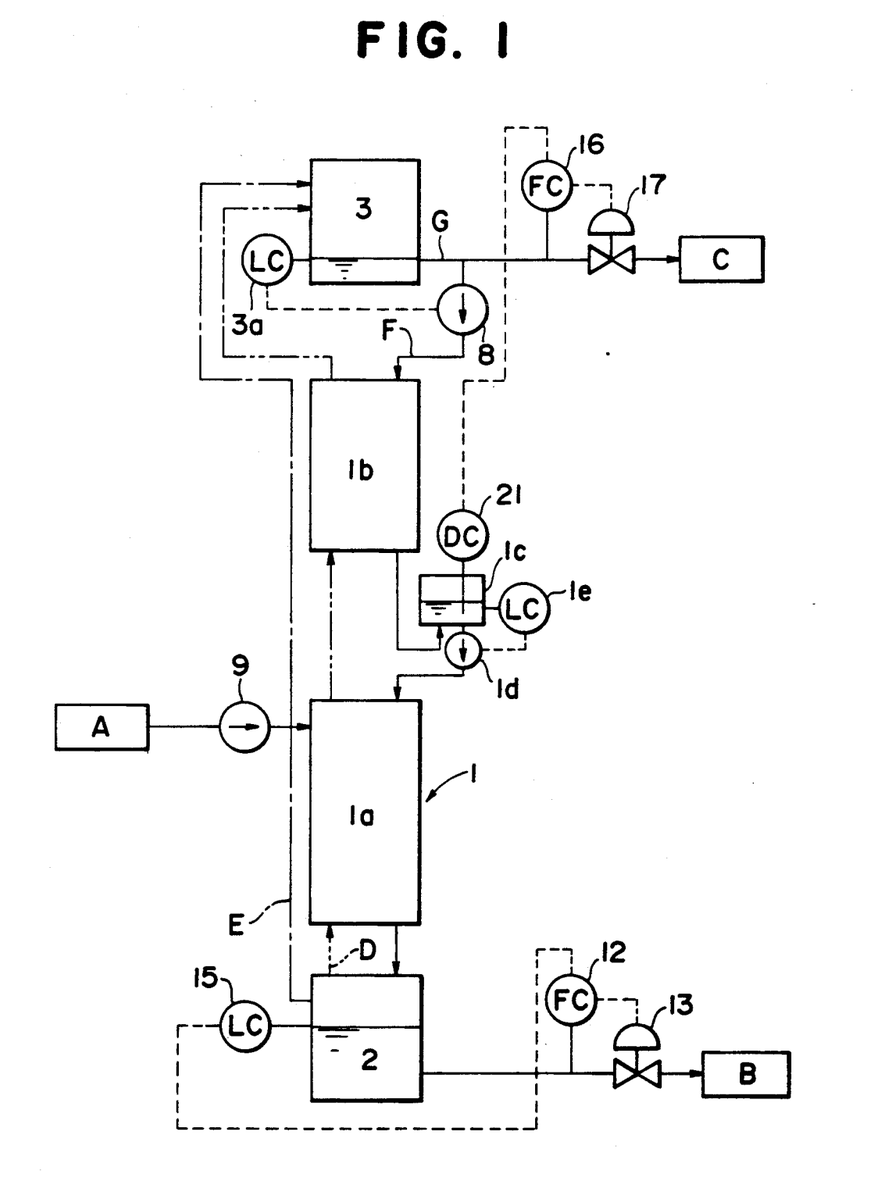
FIG. 1 is an explanatory view showing a control method according to the present invention wherein waste is withdrawn in such a manner as to keep a heavy water concentration at an intermediate portion of a reaction column constant.
Figure 2:
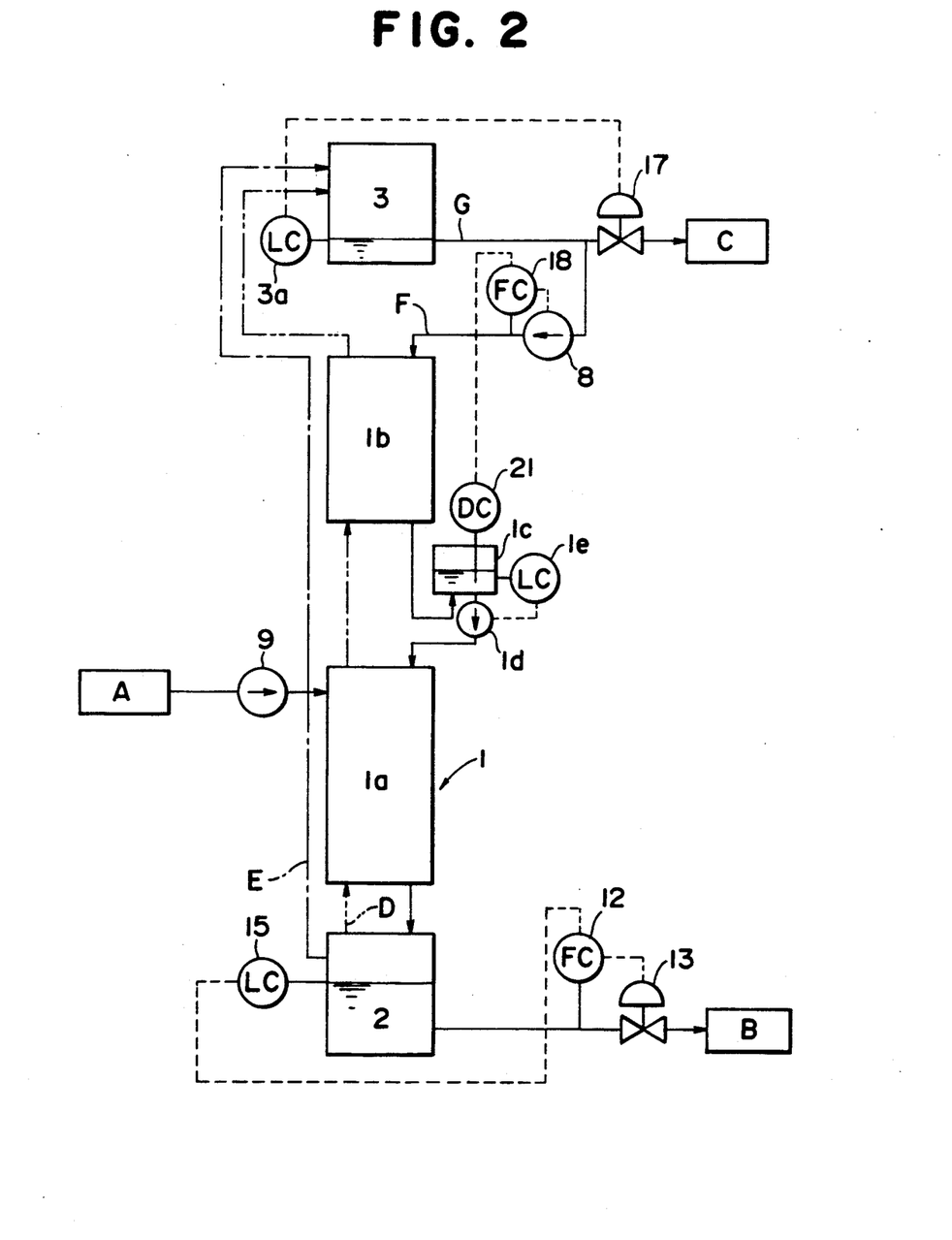
FIG. 2 is an explanatory view showing another control method according to the present invention wherein the flow rate of reflux water is controlled in such a manner as to keep the heavy water concentration at the intermediate portion of the reaction column constant and waste is withdrawn in such a manner as to keep the water quantity in a recombining system constant.

FIGS. 1 and 2 are explanatory views of the control method in accordance with the present invention, and the portions which are the same as those of FIG. 6 are represented by the same reference numeral and their explanation will be omitted.

In the control method shown in FIG. 1, the heavy water concentration of water at the intermediate portion of the reaction column 1 is measured as a density by a density controller (DC) 21 and its adjusted output signal is sent to the flow rate controller (FC) 16, which actuates the control valve 17 and waste C is extracted. Product B is extracted by operating the control valve 13 by the level controller (LC) 15 and the flow rate controller (FC) 12 in such a manner as to keep the water quantity inside the exchange reaction plant constant. The water quantity inside the exchange reaction plant changes in accordance with waste C withdrawn and with degraded heavy water A supplied.

In the control method shown in FIG. 2, the heavy water concentration of water at the intermediate portion of the reaction column 1 is measured as the density by the density controller (DC) 21, its adjusted output signal is sent to the flow rate controller (FC) 18, and this flow rate controller (FC) 18 controls the stroke of the pump 8 so as to cause reflux water to flow. The water quantity inside the recombining system 3 is measured in terms of the level by the level controller (LC) 3a and the control valve 17 is actuated by the adjusted output signal from LC 3a to extract waste C. Product B is extracted by actuating the control valve 13 by the level controller (LC) 15 and the flow rate controller (FC) 12 so as to keep the water quantity inside the exchange reaction plant constant. The water quantity inside the exchange reaction plant changes in accordance with waste C extracted and with degraded heavy water A supplied.

An example of the operation of the exchange reaction plant described above by using the control method of the present invention is as follows.

Figure 3:
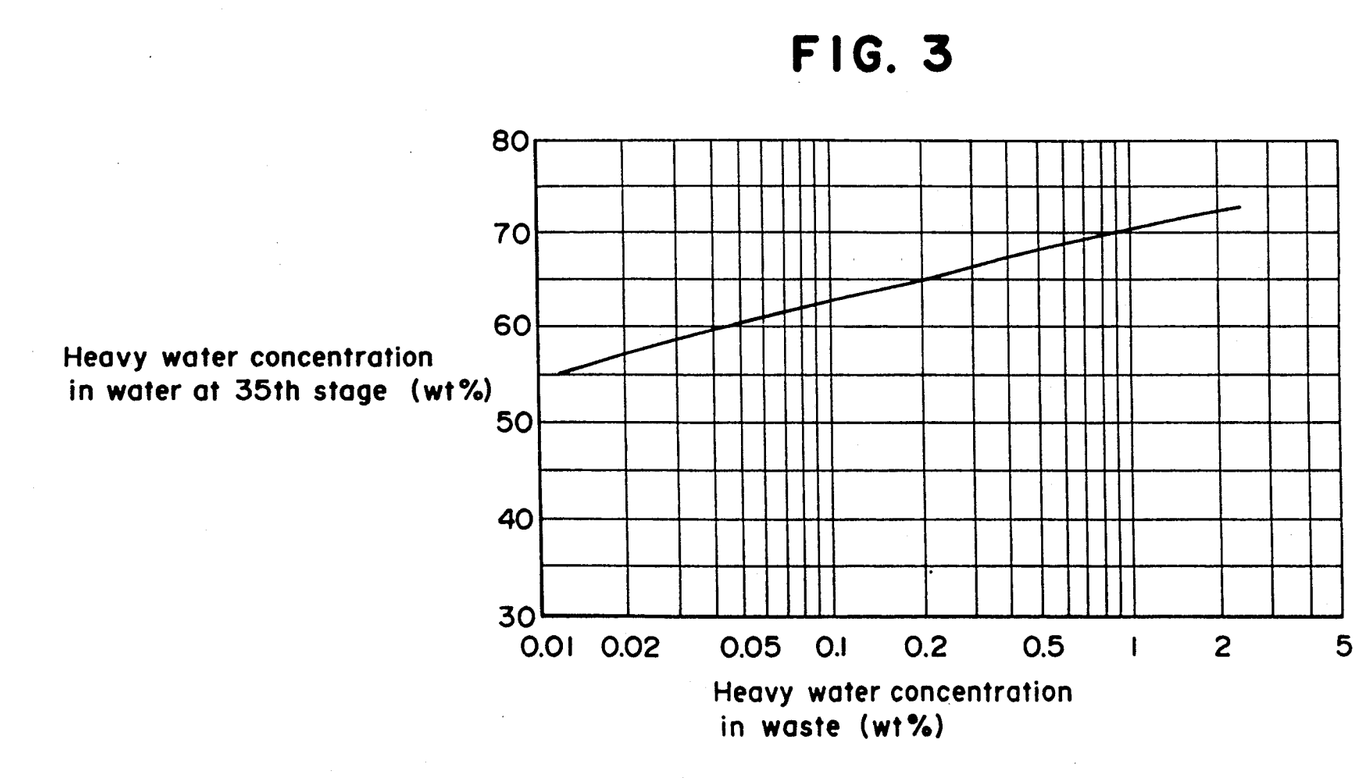
FIG. 3 is a graph showing the heavy water concentrations in waste which is withdrawn when the heavy water concentration of water at the 35th stage from the column top of the reaction column is kept at the respective heavy water concentrations.

For example, under the conditions wherein the heavy water concentration of degraded heavy water is 30 wt %, the feed quantity of degraded heavy water is 1.4 l/hr, the generated flow rate of electrolyzed hydrogen is 4 Nm$^3$/hr, the number of stages of the gas/liquid separation type exchange reaction column is 90 stages, a temperature is 70° C. and a pressure is substantially an atmospheric pressure, the relation between the heavy water concentration of waste C and that of water at the 35th stage from the top of the reaction column is such as shown in FIG. 3. As is apparent from the graph of FIG. 3, when the heavy water concentration in waste C changes from 0.1 wt % to 0.12 wt %, the heavy water concentration of water at the 35th stage changes from 62.9 wt % to 63.6 wt %.

The heavy water concentration in this concentration range can be measured by a densimeter for relatively economical industrial application, and the density at 25° C. for each of the concentrations of 62.9 wt % and 63.6 wt % correspond to 1.0646 g/cm$^3$ and 1.0653 g/cm$^3$, respectively. Even if the span of the meter is from 1.0400 to 1.0900 g/cm$^3$ at 25° C. (corresponding to about 40 wt % to about 87 wt % in terms of the heavy water concentration), the change in density is 1.4% with respect to the span of the meter and can be therefore detected sufficiently.

Accordingly, the light water retention quantity of the exchange reaction plant as a whole changes in accordance with the change of the extracting flow rate of waste by controlling the extracting quantity of waste so that the density of water continuously measured at the intermediate stage in the reaction column is kept constant, or by controlling the flow rate of reflux water and controlling the extracting quantity of waste so that the water quantity in the recombining system is kept constant. Thus, the heavy water concentration of water in the recombining system and at each portion of the reaction column changes with good response since the water retention quantity is small in the recombining system and in the reaction column. In this manner, the heavy water concentration in waste C can be controlled with good response by controlling the extracting quantity of waste so that the density of water at the intermediate stage in the reaction column is kept constant, or by controlling the flow rate of reflux water and controlling the extracting quantity of waste so that the water quantity in the recombining system is kept constant.

When the above-described control is carried out and product is extracted so that the water quantity of the exchange reaction plant is kept constant as a whole, the flow rate balance and the component balance of each of heavy and light water can be accomplished.

In this case, the concentration of product is the concentration which is determined primarily by the isotopic separation performance of the reaction column and by the material balance described above. Accordingly, the heavy water concentration of product can be increased easily by providing a margin to the number of stages of the reaction column.

If degraded heavy water contains tritium, it becomes possible not only to lower the heavy water concentration in waste below the predetermined value but also to drastically reduce the tritium concentration in waste by selecting suitably the feed position of degraded heavy water into the reaction column and selecting a suitable value for the density of water at the intermediate portion of the reaction column to be controlled.

Incidentally, the control of the extracting quantity of waste in FIG. 1 is carried out through cascade control wherein setting of the flow rate controller 16 for waste is changed by the output of the density controller 21, but may also be carried out through the direct control of the control valve 17 for extracting waste by the output of the density controller 21.

The control of the flow rate of reflux water in FIG. 2 is carried out through cascade control wherein setting of the flow rate controller 18 is changed by the output of the density controller 21 and the stroke of the pump 8 is changed by the output of the flow rate controller 18 for reflux water. However, the control of the flow rate of reflux water may also be carried out by disposing a control valve (not shown) in the reflux piping and operating this control valve, in place of the pump 8, through the cascade control. In either of these cases, it is possible to remove the flow rate controller 18 and to directly control the stroke of the pump 8 or the control valve disposed in the reflux piping.

Though the measurement of the heavy water concentration in FIGS. 1 and 2 is preferably conducted by measuring density of water, it may be conducted by measuring specific gravity or refractive index, or by measuring the heavy hydrogen concentration in hydrogen gas by a gas chromatograph of thermal conductivity detection type or a mass spectrometer.

In FIGS. 1 and 2, the extraction of product may be controlled by directly controlling the control valve 13 through the level controller 15.

In the method shown in FIGS. 1 and 2, besides keeping the water retention quantity of the whole exchange reaction plant constant, the difference between the feed quantity of degraded heavy water and the extracting quantity of waste may be used as the extracting quantity of product. Though the extracting position of product is situated in the electrolytic system 2, it may be possible to extract product flowing out from the bottom of the reaction column 1. The reaction column 1 of a gas/liquid separation type is used in FIGS. 1 and 2, but a trickle bed type may be used as well.

According to the method of the present invention having the construction described above, in the first embodiment as shown in FIG. 1, waste is extracted so that the heavy water concentration of water at the intermediate portion of the reaction column is kept constant. In such intermediate portion of the reaction column, the change in the heavy water concentration is great with respect to the change in the heavy water concentration of waste. In the second embodiment as shown in FIG. 2, the flow rate of reflux water is controlled and waste is extracted so that the water quantity in the recombining system is kept constant. Further, in both embodiments, the water quantity inside the exchange reaction plant is controlled at a constant value by the extracting quantity of product which has a slow response to product. Accordingly, in the method of the present invention, the concentrations of both product and waste can be held stably at their predetermined initial values.

An Example and a Comparative Example of the present invention will be explained hereinbelow.

EXAMPLE

Figure 4:
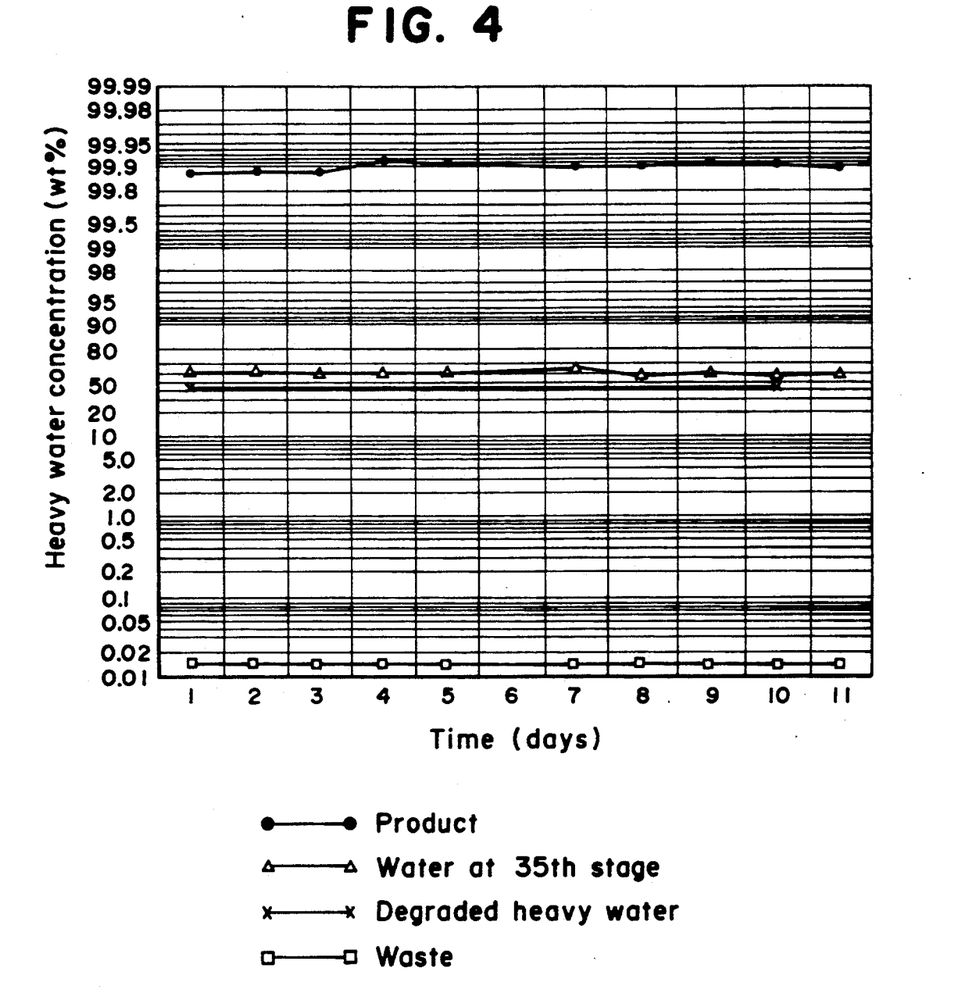
FIG. 4 is a graph showing the change, with time, of the heavy water concentration of degraded heavy water, product, waste and water at the 35th stage from the column top of the reaction column in the hereinafter-described Example.

Degraded heavy water was separated into product and waste under the following conditions by using the plant shown in FIG. 1:

heavy water concentration in degraded water: 44.8 wt %
tritium concentration in degraded water: 343 µCi/ml
feed quantity of degraded heavy water: 2.0 l/hr
generation quantity of electrolytic hydrogen: 4.0 Nm³/hr
total number of stages of reaction column: 90 stages
reaction column temperature: 70° C.
reaction column pressure: atmospheric pressure
water retention quantity of reaction column: approx. 7 l
water retention quantity of recombining system: approx. 8 l
water retention quantity of electrolytic system: approx. 250 l It was possible to control product above 99.8 wt %, the heavy water concentration in waste below 0.016 wt % and the tritium concentration in waste below $2 \times 10^{-3}$ µCi/ml by controlling the density of water flowing down from the column top to the 35th stage to about 1.06 g/cm³. The results are shown in FIG. 4.

COMPARATIVE EXAMPLE

Figure 5:
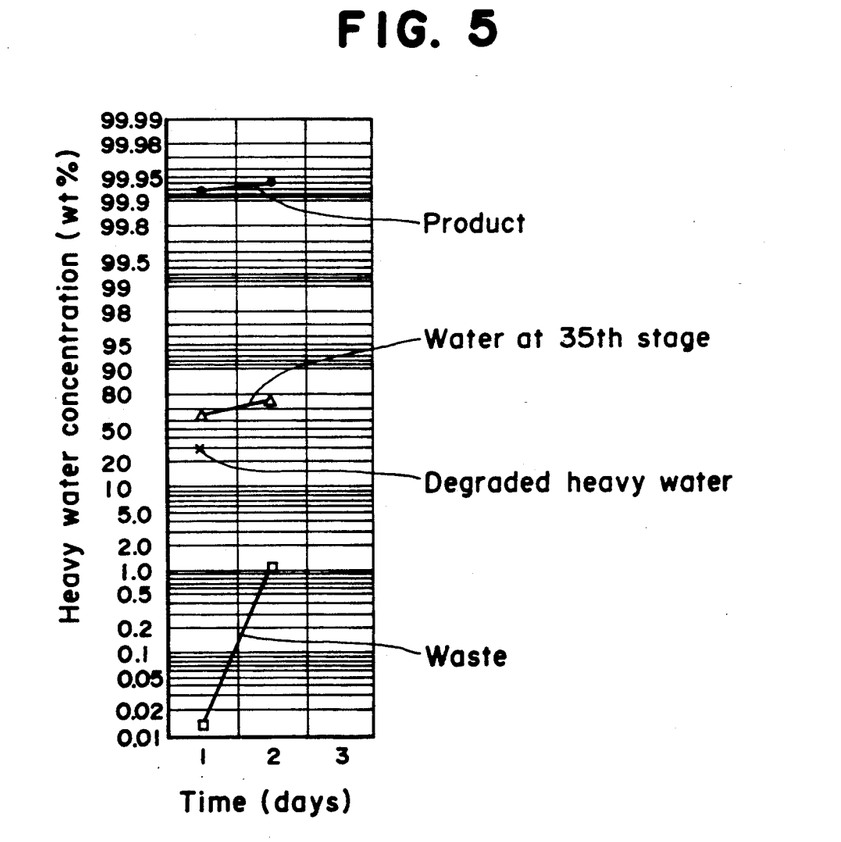
FIG. 5 is a graph showing the change, with time, of the heavy water concentration of degraded heavy water, product, waste and water at the 35th stage from the column top of the reaction column in the hereinafter-described Comparative Example.

Degraded heavy water was separated into product and waste under the following conditions by using the plant shown in FIG. 6:

heavy water concentration in degraded heavy water: 30 wt %
feed quantity of degraded heavy water: 1.4 l/hr
generation quantity of electrolytic hydrogen: 4.0 Nm³/hr
total number of stages of reaction column: 90 stages
reaction column temperature: 70° C.
reaction column pressure: atmospheric pressure The results are shown in FIG. 5. As can be seen clearly from FIG. 5, stable control could not be made by the control method as shown in the Comparative Example.

As being described in the foregoing, the control method of the present invention provides high response speed, since the extracting quantity of waste (the major proportion thereof is occupied by light water whose amount inside the exchange reaction plant is small) is controlled so that the heavy water concentration of water at the intermediate portion of the reaction column exhibiting large change in the concentration is kept constant. Further, the distribution of concentration at each portion of exchange reaction plant is not disturbed by disturbances such as changes in the feed quantity or in the heavy water concentration of the degraded heavy water introduced into the exchange reaction plant. The product (the major proportion thereof is occupied by heavy water whose amount inside the exchange reaction plant is large) is extracted so that the water quantity inside the exchange reaction plant (it is changed by the quantity of waste withdrawn and the quantity of degraded heavy water introduced) is kept constant. As a result, degraded heavy water is separated into waste and product both of which have a stable concentration.

What is claimed is:

1. A method of controlling a single temperature type water/hydrogen isotopic exchange reaction plant comprising an electrolytic system, an exchange reaction column and a recombining system for separating heavy water having a concentration lowered by light water into high concentration heavy water and high concentration light water in a process comprising the steps of introducing the heavy water having a concentration lowered by light water into the exchange reaction column, providing for the heavy water to flow to the bottom of the exchange reaction column and into the electrolytic system to be discharged therefrom as high concentration heavy water, while providing for the light water to flow to the top of the exchange reaction column and into the recombining system to be discharged therefrom as high concentration light water, the method comprising the steps of:

controlling the quantity of the high concentration light water discharged from the recombining system so that the concentration of heavy water at an intermediate portion of the exchange reaction column is kept constant, and controlling the quantity of the high concentration heavy water discharged from the electrolytic system so that a water quantity inside the isotopic exchange reaction plant is kept constant.

2. A method of controlling a single temperature type water/hydrogen isotopic exchange reaction plant comprising an electrolytic system, an exchange reaction column and a recombining system for separating heavy water having a concentration lowered by light water into high concentration heavy water and high concentration light water in a process comprising the steps of introducing the heavy water having a concentration lowered by light water into the exchange reaction column, providing for the heavy water to flow to the bottom of the exchange reaction column and into the electrolytic system to be discharged therefrom as high concentration heavy water, while providing for the light water to flow to the top of the exchange reaction column and into the recombining system to be discharged therefrom as high concentration light water, the method comprising the steps of:

dividing the light water discharged from the recombining system into a flow of the high concentration light water and a flow of reflux water and recycling the reflux water back to the exchange reaction column, controlling the flow rate of the reflux water to the exchange reaction column so that the concentration of heavy water at an intermediate portion of the exchange reaction column is kept constant, controlling the quantity of the high concentration light water discharged from the recombining system so that a water quantity in the recombining system is kept constant, and controlling the quantity of the high concentration heavy water discharged from the electrolytic system so that a water quantity inside the isotopic exchange reaction plant is kept constant.

3. The method according to claim 1 or 2, wherein the concentration of heavy water at the intermediate portion of the exchange reaction column is kept constant by measuring the density of the water.

* * * * *